Jan. 22, 1963  J. W. MILLER ET AL  3,074,147
MATERIAL WORKING MACHINE WITH MULTIPLE TOOL HOLDER
Filed July 30, 1959  7 Sheets-Sheet 1

Inventors
John W. Miller
Herbert W. Nidenberg
by Paul A. Frank
Their Attorney

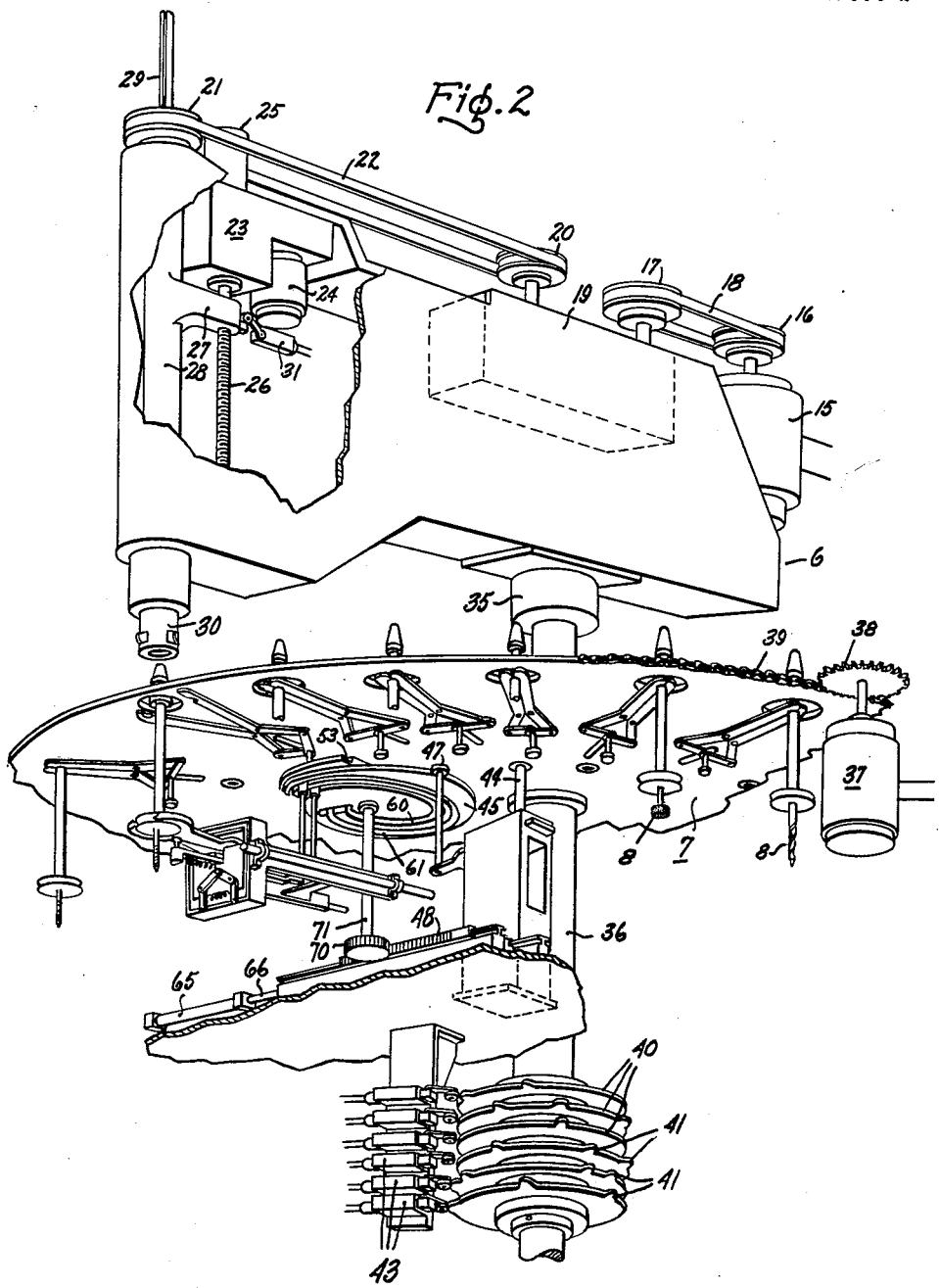

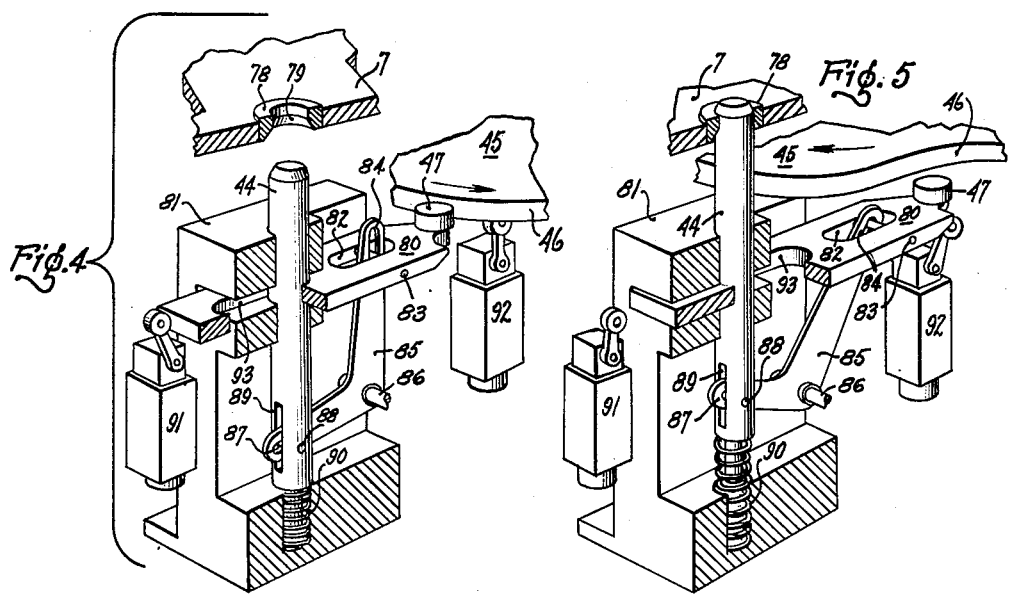

Jan. 22, 1963   J. W. MILLER ET AL   3,074,147
MATERIAL WORKING MACHINE WITH MULTIPLE TOOL HOLDER
Filed July 30, 1959   7 Sheets-Sheet 4
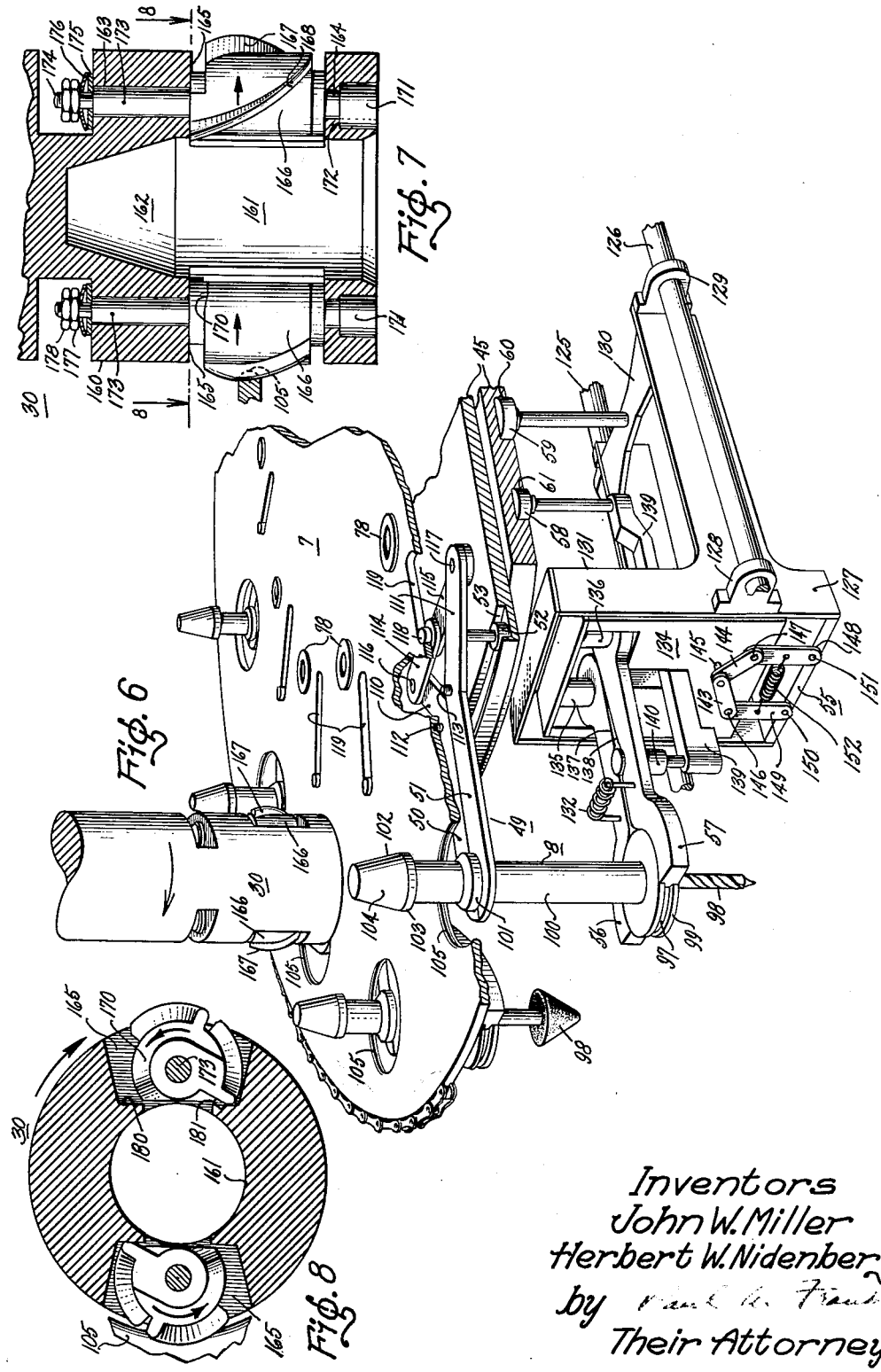
Inventors
John W. Miller
Herbert W. Nidenberg
by
Their Attorney

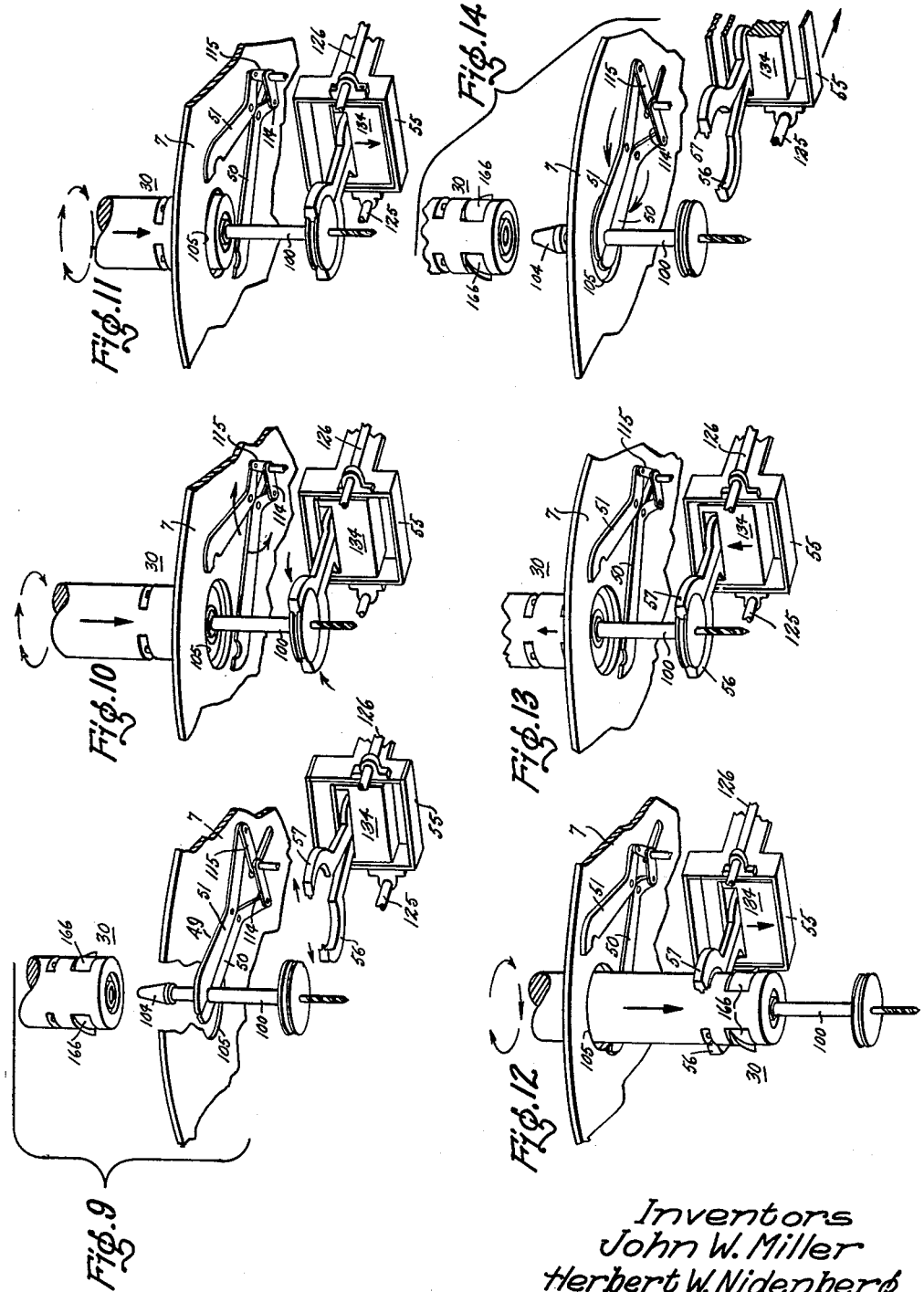

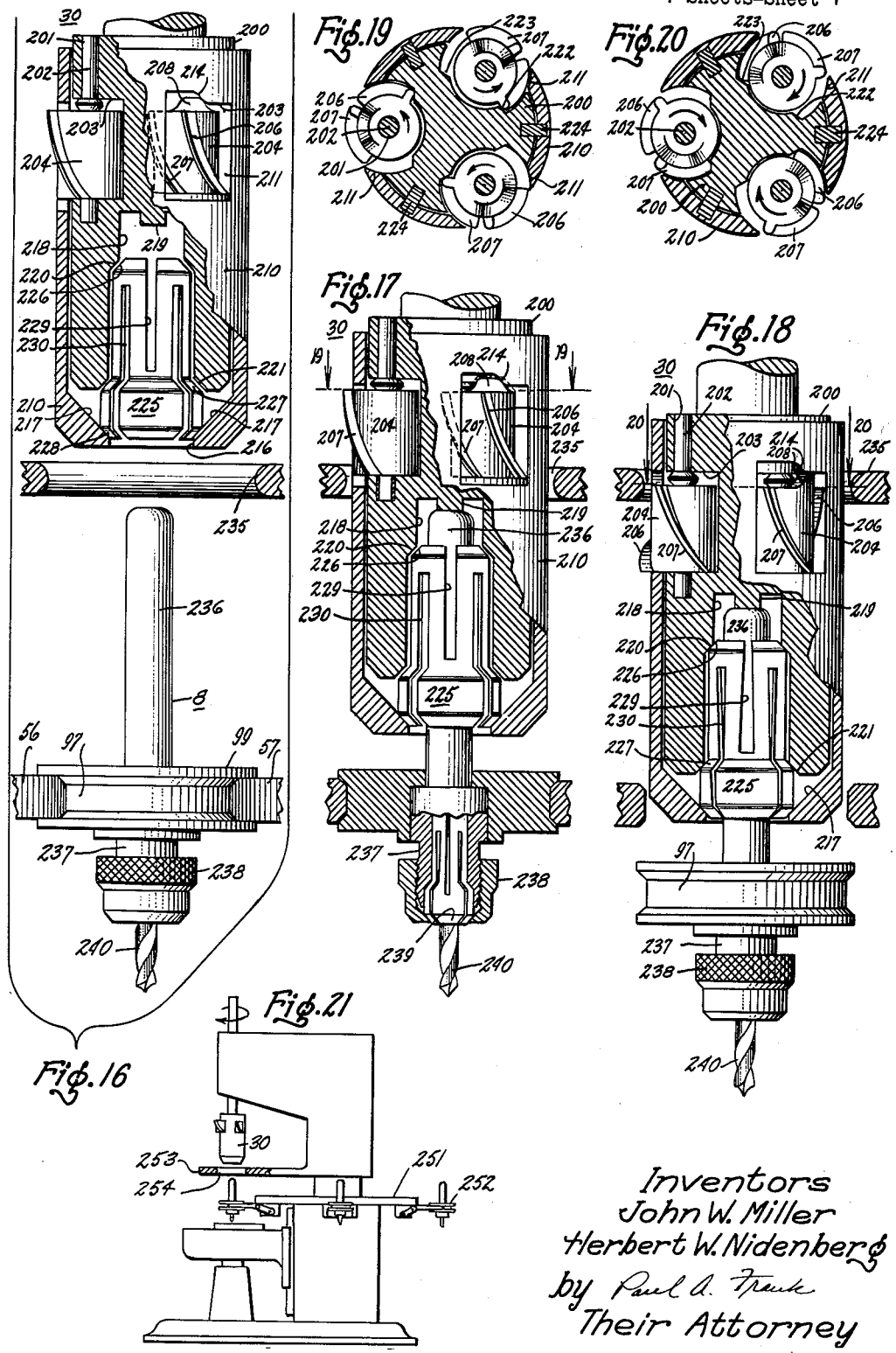

United States Patent Office 3,074,147
Patented Jan. 22, 1963

3,074,147
MATERIAL WORKING MACHINE WITH
MULTIPLE TOOL HOLDER
John W. Miller and Herbert W. Nidenberg, Schenectady, N.Y., assignors to General Electric Company, a corporation of New York
Filed July 30, 1959, Ser. No. 834,907
12 Claims. (Cl. 29—26)

This invention relates to machine tools and, in particular, to a material working machine adapted to operate a plurality of tools. This invention also relates to a method of operating a material working machine having a plurality of tools.

Material working machines in which a plurality of tools are supported to effect a machining operation upon a work piece have long been known. It is customary in such machines to mount the individual tools in bearings and to have a rotatable spindle engage the tool to cause it to effect the machining operation upon a work piece. Usually the tools are supported in a rotatable turret which can be moved to a position below the rotatable spindle, and the work piece is mounted upon a table which is movable horizontally in transverse and longitudinal directions. Such material working machines are both expensive and limited in their operations, one of the requirements of the machines being that each tool must be separately supported and accurately aligned in bearings mounted in the turret.

It is an object of our present invention to provide an improved material working machine with a multiple tool holder which obviates the requirement for accurate alignment of the individual tools in their supporting means.

It is another object of our invention to provide an improved material working machine in which a plurality of tools are normally supported in non-operating positions, selectively removed to perform machining operations, and returned to their supporting means at the completion of an operation.

It is a further object of our invention to provide a new and improved arrangement for successively and automatically actuating selective tools in a material working machine to perform desired machining operations on a work piece.

It is a still further object to provide an improved method of operating a material working machine having a plurality of tools.

One of the features of this invention is the use in a material working machine of a rotatable support for a plurality of tools which can be selectively moved into positions relative to a spindle to be engaged by tool engaging means carried by the spindle which means removes the tool completely from its normal support and in cooperation with the rotating spindle effects a machining operation on a work piece, the tool being returned to its normal supporting means at the end of a machining operation.

This invention is also related to a method of operating a material working machine having a plurality of tools in which the steps consist of movably supporting a plurality of tools, locating at least one of the tools concentrically with a rotating spindle, continuously advancing the spindle, movably supporting the tool as it contacts the spindle, moving the support with the tool longitudinally with the spindle, connecting the tool to the spindle, discontinuing the support of the tool after the tool is connected to the spindle and advancing the tool to the work piece.

The invention will be more clearly understood from the detailed description of a preferred embodiment described in the accompanying drawing in which, FIGURE 1 is a perspective view of a material working machine embodying the present invention. This view also includes perspective views of control means for operating the machine;

FIGURE 2 is a fragmentary sectional view in perspective of the machine shown in FIGURE 1;

FIGURE 3 is a fragmentary perspective view of a rack and pinion drive which operates a complex cam which controls the turret positioning means and the tool holding means of the apparatus shown in FIGURE 2;

FIGURES 4 and 5 are fragmentary sectional views in perspective of the means for positioning the turret;

FIGURE 6 is a fragmentary sectional view in perspective showing the turret and associated primary and secondary tool holding devices;

FIGURE 7 is a sectional view of the chuck utilized in the machine shown in FIGURES 1 and 2;

FIGURE 8 is a sectional view of the chuck shown in FIGURE 7 taken along the line 8—8;

Figure 1:
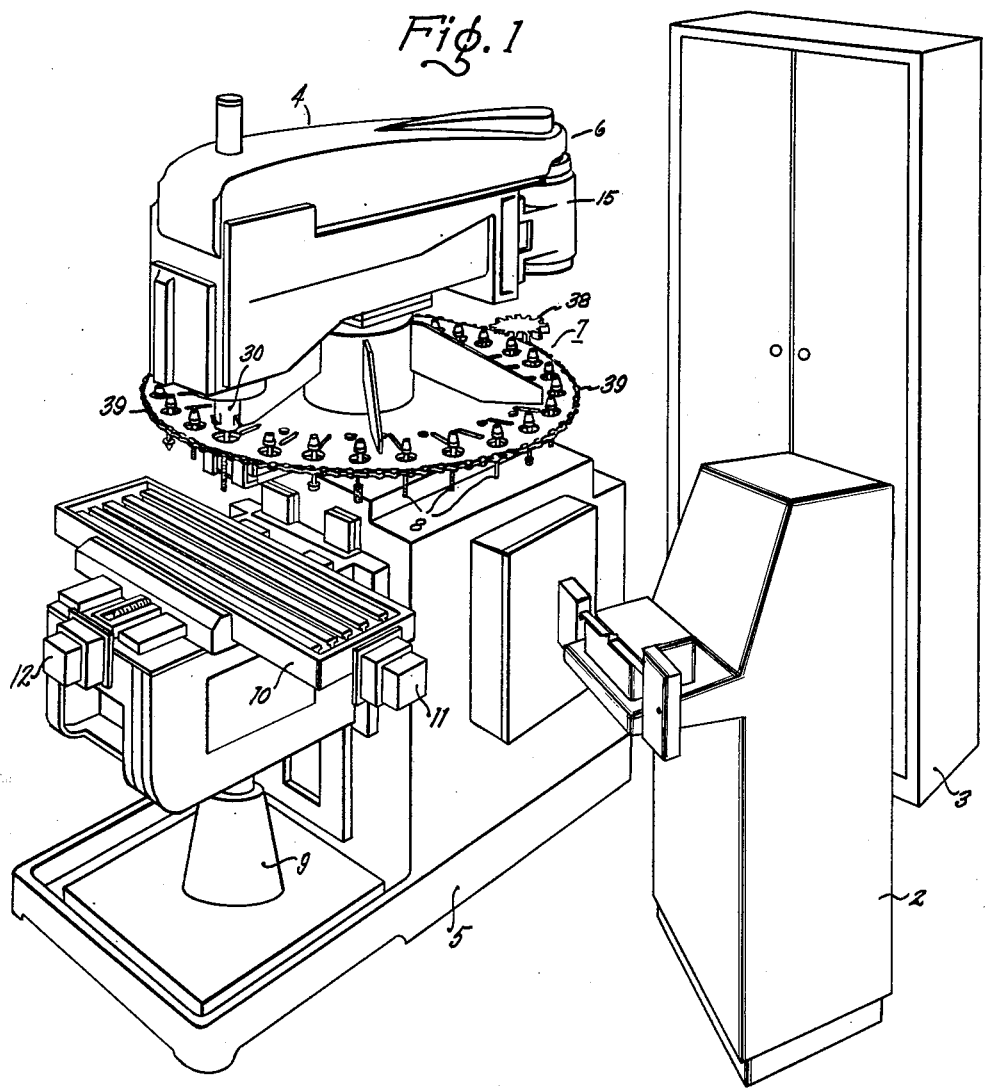
Figure 15:
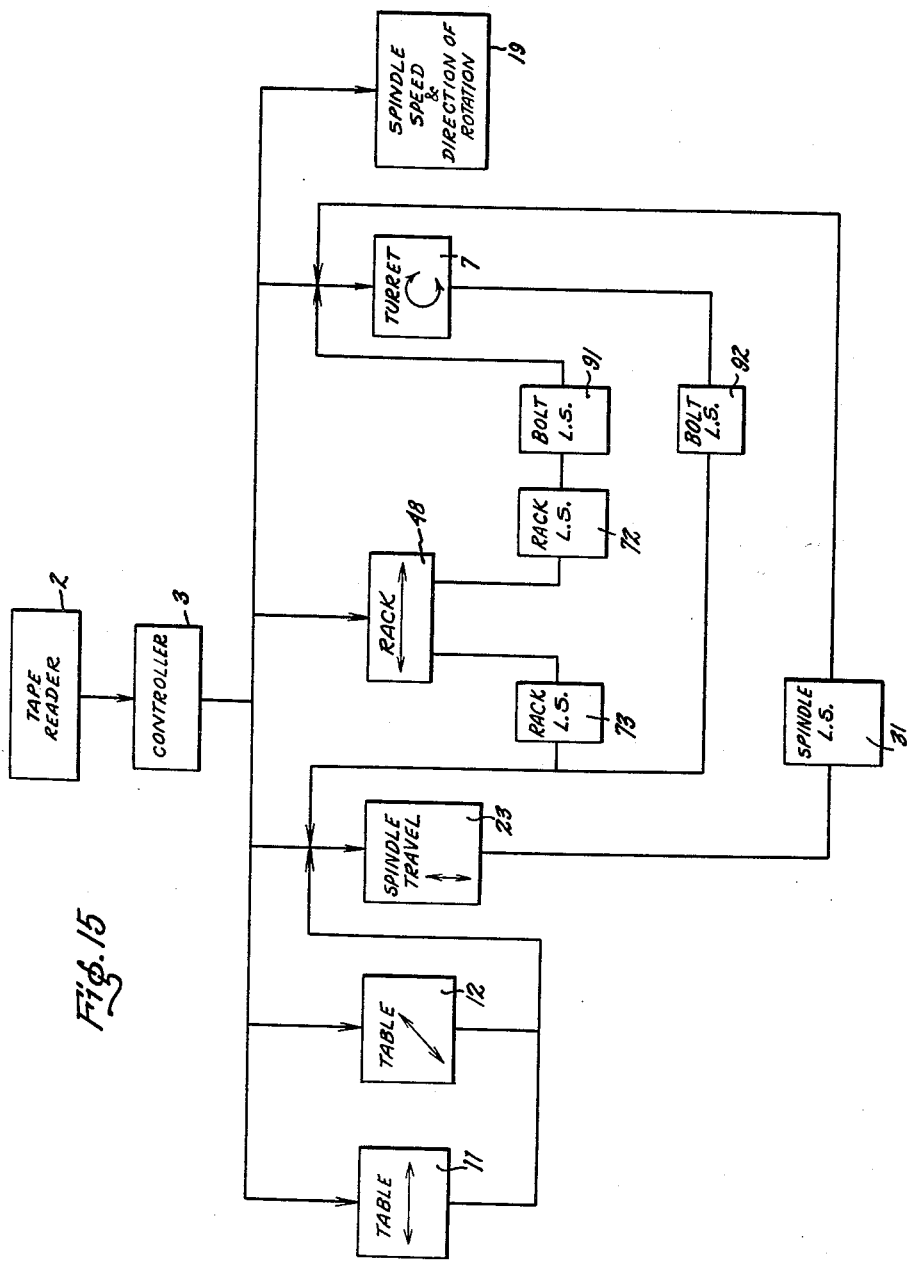

FIGURES 9, 10, 11, 12, 13, and 14 are fragmentary views in perspective showing the progressive operation of the chuck in association with the primary and secondary tool holding devices;

FIGURE 15 is a block diagram showing the functional relationship between the controls shown in FIGURE 1 and the various portions of the machine embodying the present invention;

FIGURES 16, 17 and 18 are fragmentary views, partially in section, of another embodiment of the chuck shown in FIGURE 7 with the chuck and tool progressively shown during operation;

FIGURE 19 is a section view of FIGURE 17 taken along the line 19—19;

FIGURE 20 is a sectional view of FIGURE 18 taken along the line 20—20 and

FIGURE 21 is a view in elevation of another embodiment of the invention shown in FIGURE 1.

Referring to FIGURE 1 there is shown a machine 2 for reading a tape, which tape may be of the perforated type or of the magnetic type. Associated with this tape reader is a suitable control 3. This tape reader 2 with its control 3 is adapted to regulate the various functions of the vertical spindle machine 4. The tape reader with its control may be of any well known design such as the type disclosed in Livingston Patent 2,537,770; granted January 9, 1951; entitled "Programming Control System."

The vertical spindle machine may comprise a head 6 which is mounted on a base 5. Also mounted on this base 5 may be a suitable turret 7 adapted to annularly support a plurality of tools 8. In the present embodiment 31 tools are mounted on the turret 7. Beneath the spindle head and the turret is located a table 10 which is mounted on a pedestal 9. This table may be moved horizontally in various directions by means of the selsyn controls 11 and 12 which move the table in response to the tape in the tape reader 2. These selsyn controls may be of any conventional design such as those disclosed in previously mentioned Livingston patent or Kelling Patents 2,764,720; 2,820,186 or 2,848,670.

FIGURE 2 discloses a fragmentary view of the spindle head 6 and turret 7 with related components. The spindle head 6 includes a motor 15 which drives a sheave 16 connected to sheave 17 by means of the belt 18. The sheave 17 is mounted on the input shaft of the transmission 19 and the output shaft of this transmission is connected to the sheave 20. This transmission may be of any conventional multiple speed type. In the present embodiment it is desired that this transmission contain a plurality of reducing gear trains and be actuated by magnetic clutches which respond to the tape reader 2 so that a plurality of speeds and a change in direction of the output rotation of the sheave 20 may be achieved. The sheave 20 is operatively connected to the sheave 21 by means of the belt 22.

The sheave 21 is connected to the spindle 29 which is capable of vertical motion relative to sheave 21. A chuck 30 which will be more fully described hereinafter is mounted on the spindle 29. The spindle 29 is mounted in suitable bearings in a housing 28. The flange 27 of the housing 28 is operatively connected to a lead screw 26. This flange 27 engages the lead screw and thereby urges the housing 28 to move in a vertical direction in in response to the drive motor 24 which is associated therewith. The operation of the drive motor 24 is in response to the selsyn control 23 and includes the selsyn motor 25. This selsyn control may be of the type described in the Kelling patents. The flange 27 has a suitable abutment which coacts with a limit switch 31 for a purpose to be more fully described hereinafter.

The entire spindle head 6 is supported by the pedestal 35 which is mounted upon the base 5 of the machine. Concentric with this pedestal 35 and located below the spindle head is a rotatable support 36 upon which the turret 7 is mounted. The turret 7 has a large disc shape and is driven by a motor 37 which has an output sprocket 38. The sprocket 38 engages a chain 39 or other form of gear tooth which extends around the periphery of the turret 7.

In order to substantially locate the tools 8 in a predetermined position in the machine, the motor 37 is provided with suitable controls which respond to the tape reader 2. These controls include a plurality of cams 40 mounted on the rotatable support 36. The cams, in the present embodiment are six in number, and each has a plurality of protuberances which actuate a plurality of limit switches 43. The simultaneous actuation of any odd number of limit switches in response to the protuberances 41 on the cams 40 determines the position of one of 31 tools mounted on the table turret 7.

The tape reader in response to suitable perforations or magnetic characteristics of the tape signifies which limit switches 43 should be actuated and also the direction of rotation of the motor 37. When these predetermined limit switches are actuated the desired tool 8 is in the desired position.

This desired position is one wherein a desired tool 8 is placed substantially concentric with the chuck 30. This chuck 30 is attached to the spindle 29 and its purpose is to engage a tool and urge it toward the table 10, shown in FIGURE 1, upon which a work piece is attached. As previously mentioned, the turret 7 in the present invention is capable of supporting 31 tools. These tools may perform different functions such as drilling, tapping, grinding, and related cutting operations on a work piece mounted on the table 10. These operations are performed at various points of the work piece and in certain instances it may be desired to perform these operations while the table is in motion.

It will be appreciated that the axis of a spindle 29 and the chuck 30 is fixed and that it is necessary to align the tool 8 with this chuck to enable engagement therebetween. To achieve this, after the turret has been turned by the action of the motor 37, a locating bolt 44, in response to a cam follower 47, locks the turret in an aligned position. This cam follower 47 is actuated by a cam 45 and the cam follower 47 coacts with the surface 46 thereof.

A rack and pinion drive 48 rotates the cam 45 causing a plurality of cam followers to perform a select group of operations. The cam surface 53 actuates the primary tool holding device 49. Each tool holding device 49 includes a pair of levers 50 and 51 which grasp a tool 8. These levers are moved in response to the cam surface 53 in a manner to be more fully described hereinafter.

The cam 45 also has surfaces 60 and 61 which actuate the cam followers 58 and 59. These followers suitably move the claw members 56 and 57 of the secondary tool holder 55. The operation and construction of the secondary tool holding device will also be more fully described hereinafter.

FIGURE 3 discloses a fragmentary view of the rack and pinion drive 48 shown in FIGURE 2. The rack and pinion drive 48 is actuated by hydraulic cylinder 65. The movement of the piston in the cylinder is controlled by the previously mentioned tape control. Actuation of the cylinder 65 causes the rod 66 to move the rack 67 longitudinally on the tracks 68 and 69. Such motion of the rack 67 causes rotation of the pinion 70 which is mounted on the shaft 71. The shaft 71 has mounted thereon the cam 45. As part of a control system which will be more fully described hereinafter, two limit switches 72 and 73 are provided which are adapted to be engaged by the rack 67. The limit switch 72 indicates that the primary and secondary tool holders are in their proper position to permit rotation of the turret. The limit switch 73 indicates a position of the rack 67 wherein the spindle 29 may engage the tool in the turret.

Figures 4 and 5 disclose the manner in which the bolt 44 positively positions the turret so that the spindle with its chuck may engage a tool 8. FIGURE 4 illustrates the bolt in its retracted position in which condition the turret may rotate. FIGURE 5 shows the bolt engaging the turret to indicate that the turret is in position to permit the chuck to engage the tool.

The turret 7 has located therein a plurality of inserts 78, each having an opening therein. An insert 78 is provided for each tool position. This insert has a tapered surface 79. When the bolt 44 is urged upward into engagement with the turret, the tapered surface 77 of the bolt 44, in the event that perfect alignment is not present, will engage the tapered surface 79 in such a manner as to rotate the turret slightly to permit the bolt to pass fully into the opening in the insert 78.

Referring to FIGURE 4, the surface 46 of the cam 45 engages the cam follower 47 which is mounted on the reciprocal plate 80. This plate reciprocates in the frame 81. The bolt 44 is also reciprocally mounted in the frame 81. The plate 80 has a slot 82 therein with a pin 83 passing across said slot. The pin 83 engages the slot 84 located at one end of the bell crank 85. The bell crank 85 is pivotly mounted on the pin 86 which is attached to the frame 81. The other end of the bell crank 85 is also provided with a slotted opening 87. The second end of the bell crank 85 extends into the slot 89 of the bolt 44. A pin 88 extends across the slot 89 for the purpose of engaging the slot 87 of the bell crank 85.

As previously noted the bolt 44 is reciprocally mounted in the frame 81. This bolt is biased in a upward position by means of the spring 90. It will be noted in FIGURE 4, by means of the action of the bell crank 85, the plate 80 and the cam 45, the bias of the spring is overcome and the bolt 44 is in its retracted position.

FIGURE 5 shows a condition wherein the surface 46 of the cam 45 no longer engages the cam follower 47.

Since there are no restraining forces on the plate 80, the spring 90 passes the bolt 44 upwardly to engage insert 78 in the turret 7. This is possible since the lack of restraining forces on the plate 80 permits rotation of the bell crank 85 about the pin 86 and the bolt passes upwardly through the slot 93 in the plate 80 to engage the turret.

It will be noted that two limit switches 91 and 92 are associated with the reciprocal plate 80. The limit switch 91 when engaged indicates that the turret may rotate to another position. The limit switch 92 indicates that the spindle may advance since the turret is bolted into its operating position.

FIGURE 6 discloses the turret 7 and its relationship to the chuck 30 and the tool 8. Portions of the turret 7 are suitably cut away to show the component parts of the primary tool holding device 49 and their relationship with the cam 45. The secondary tool holding device 55 is also shown with its relationship with the cam 45.

It will be noted that the tool 8 is not an elementary tool but rather includes a support with the actual working tool 98 which engages the work piece. The tool 98 is attached to a disc 99 which has an annular groove 97. This disc 99 is adapted for engagement with the secondary tool holding device 55. Above the disc 99 is located a shank 100 which has an annular shoulder 101 adapted to be engaged by the primary tool holding device 49. The upper portion of the tool 8 comprises a chuck engaging portion 102 which includes a shoulder 103 and a frusto-conical portion 104.

The primary tool holding device 49 comprises two lever members 50 and 51, the ends of which are suitably scalloped to engage the shank 100 of the tool 8. The levers 50 and 51 are actually bell cranks which are pivoted on the pins 112 and 113, respectively. The second end 110 of the bell crank 50 is pivotly connected to a link 114 by means of pin 116. Similarly the bell crank 51 has its end 111 pivotly connected to the link 115 by means of the pin 117. The opposite ends of links 114 and 115 are pivotly connected to the longitudinal pin 18. One end of the pin 118 slides in the slot 119 in the turret 7. The opposite end of the pin 118 is attached to the cam follower 52 which rides in the cam surface 53 of the cam 45. Relative motion of the cam follower 52 causes the pin 118 to slide to and fro in the slot 119 causing the scalloped ends of the levers 50 and 51 to separate thereby releasing the tool 8.

The primary tool holders 49 are intended to retain the individual tools on the turret 7 in such a manner that the chuck engaging portions 102 of each tool 8 extends up through the hole portions 105 in the turret 7. The primary tool holders 49 are not of sufficient rigidity to sustain the contact between the chuck 30 and the tool 8. It is desirable to keep the primary tool holder of a light, simple construction so as to maintain the weight on the turret as low as possible. It will be appreciated that if it is intended that the primary tool holder be sufficiently well constructed to hold the tool when the chuck is in the process of engagement this sturdy construction would have to be repeated 31 times. Rather than provide such a construction, a single secondary tool holder of sturdy construction is provided. This tool holder is provided at a point adjacent the axis of the spindle. For the purpose of engagement, the tool 8 is provided with the disc 99 having the groove 97.

The secondary tool holding device 55 comprises a frame member 127 which has a cross member 130. This cross member 130 is connected to the cam follower 59 which engages the cam surface 60 of the cam 45. The frame 127 is reciprocally mounted on the parallel rods 125 and 126.

FIGURE 6 discloses two flanges 128 and 129 which mount the frame 127 onto the rod 126. It can be seen that by the action of the cam 45 relative to the cam follower 59 reciprocating motion of the frame 127 will occur on the rods 125 and 126.

The frame 127 is provided with a box portion 131. This box portion 131 has located therein a reciprocal frame 134. The frame has mounted thereon two pins 135 and 136 which support the claw members 56 and 57 for relative rotary motion. These claw members are biased in a closed position by means of the spring 132.

In order to open the claws 56 and 57, a pin 140 is located in an indented portion between the claws 56 and 57. This indented portion of the claws includes two cam surfaces 137 and 138 upon which the pin 140 slides. It will be appreciated that by retracting the pin away from the tool 8 the pin rides along the surfaces 137 and 138 causing the claws to rotate in opposite directions to release the disc 99. In order to provide such movement of the pin 140, the pin 140 is mounted on a reciprocal member 139 which is in turn connected to the cam follower 58. The cam follower 58 rides in the cam surface 61 of the cam 45.

The frame 134 is adapted to reciprocate in an upward and downward direction in the frame 127. If desired, suitable tracks or other means may be located within the box portion 131 of the frame 127 to readily permit this motion.

The upward and downward motion of the frame 134 occurs during the contact, engagement and disengagement of the chuck 30 with the tool 8 in a manner to be more fully described hereinafter.

It is desirable when the frame 134 approaches one end of its travel within the box portion 131 of the frame 127 that a bias be exerted on the frame 134 to maintain it in an end position. This action is accomplished by the toggle links 143 and 144 which are pivotly mounted on the pin 145. The pin 145 is attached to the frame 134. The opposite end of the toggle link 143 is pivotly connected to the link 149 by means of the pin 146. The opposite end of the link 144 is pivotly connected to the link 148 by means of pin 147. The link 148 has its other end pivotly connected to the frame 127 by means of the pin 151 and pin 150 connects the link 149 to the frame 127. The links 149 and 148 are biased toward one another by means of the spring 152.

By this construction when toggle pin 145 is located above the pins 146 and 147, the spring 152 will tend to urge the frame 134 into an upward position. When the chuck 30 engages the tool 8 the entire frame 134 will be urged downwardly and the frame will slide within the box portion 131 of the frame 127. The toggle pin 145 will then pass below the level of the pins 146 and 147. When this occurs because of the toggle linkage the bias exerted by the spring 152 causes the frame 134 to be urged in a downward direction.

Referring to FIGURE 7 there is shown a sectional view of the chuck 30 appearing in FIGURE 6. The chuck 30 is attached to the spindle 29 and includes a housing 160 having a concentric cylindrical hole 161 therein which terminates in a frusto-conical portion 162. The housing 160 has a general cylindrical shape and there are located two hollow portions 165 in the housing. These hollow portions 165 extend from the outer cylindrical surface of the housing to the cylindrical hole 161. The housing has eccentrically located holes 164 extending upwardly from the bottom portion of the housing to the hollow portion 165. Second holes 163 located above the hollow portion 165 are concentric with the holes 164.

A cylindrical cam 166 is placed into each hollow portion 165. The cylindrical cam 166 has two helical cam surfaces 167 and 168. These surfaces in the present embodiment are separated by approximately 70°. The function of the cam surface 167 is to rotate the cylindrical cam 166 in a counter clockwise direction as shown in FIGURE 8. This occurs when the rotating chuck is urged downwardly so that the cam 167 engages the surface of the opening 105 in the turret. After the chuck has passed through this opening the cam surface 168 is exposed and upon passing the chuck upwardly through the opening 105 the cams 166 are rotated in a clockwise direction thereby exposing the cam 167. The upper shoulders of the cylindrical cams 166 are provided with third cam surfaces 170 which are adapted to engage the shoulder 103 of the tool 8. This may occur when the frusto-conical surface 104 of the chuck engaging portion of the tool contacts the surface 162 of the chuck. The rotation of the cylindrical cams 166 upon the downward motion of the chuck cause the cam surface 170 to engage the surface 103 of the tool. Upon the chuck passing upwardly through the opening 105 in the turret 7 the cam surface 170 disengages the shoulder 103 and permits the tool to disengage and pass from the concentric hole 161 of the chuck.

These cams may be rotatably mounted in any suitable manner. In the present embodiment a pin 171, having a shoulder portion 172, and a shank portion 173 is utilized. The shoulder portion 172 passes through hole 164 and the shank portion 173 passes through the cam 166 and the hole 163. The upper end of each pin 171 has a threaded portion 174 over which are placed a washer 175, a Belleville spring 176 and two lock nuts 177 and 178. By this means the pin 171 with the cylindrical cam is biased on an upward position within the housing 160.

By referring to FIGURE 8 it will be noted that the hollow portion 165 has two abutment portions 180 and 181 which engage the ends of the cams 167 and 168 to limit the movement of the cylindrical cams.

Considering the operation of the present machine a suitable working piece is attached to the table 10. The height of the table may be adjusted manually. Various tools 8 are placed in the turret 7 and a tape having a suitable program is placed in the tape reader 2.

A signal from the tape reader 2 (referring to FIGURE 15) is passed to the control 3. The signals so received by the control 3 are relayed to the table selsyns 11 and 12 which suitably move the table and the work piece to a proper position with respect to the spindle of the machine. The control 3 similarly adjusts the transmission 19 (FIGURES 2 and 15) to the proper spindle speed and also determines the proper direction of rotation of the spindle. The rack 67 in FIGURE 3 is in the position to the extreme left so that the rack 67 engages the limit switch 72. This position of the rack 67 also determines through the connection with the pinion 70 and the shaft 71, the position of the cam 45. With the rack in this position, the bolt 44 for positioning the turret 7 is located as shown in FIGURE 4. In this situation the limit switch 91 is engaged by the reciprocal member 80. With the limit switches 72 and 91 so actuated a signal from the tape may be transmitted to the turret drive motor 37 (FIGURE 2) to position one of the tools 8 concentric with the spindle 29 and the chuck 30. The position of a particular tool 8 is determined by the cams 40 actuating an odd number of specific limit switches 43 simultaneously.

At this point the tape reader 2 transmits a signal to actuate the cylinder 65. This urges the cylinder to move the rack 67 to the position shown in FIGURE 3. The movement of the rack rotates the cam 45 by means of the connection with the pinion 70. The cam surface 46 disengages the cam follower 47. The bias of the spring 90 is no longer restrained and the bell crank 85 is rotated and the member 80 is permitted to move. The spring 90 simultaneously urges the bolt 44 into engagement with the turret to align a tool 8, which has been selected by the tape reader, with the spindle 29 and the chuck 30. The movement of the member 80 to the position in FIGURE 5 causes the limit switch 92 to be actuated. The limit switch 73 in FIGURE 3 has also been engaged by the rack 67 which permits the spindle to travel (FIGURE 15). Spindle travel is determined by the motor 24 as regulated by the selsyn controller 23. This selsyn controller 23 determines the rate of speed and the distance that the spindle will travel toward the work piece.

During a tapping operation the transmission 19 will rotate the spindle at a predetermined speed while the selsyn control 23 will feed the tap at a predetermined speed into the work. The selsyn control 23 will determine the depth of the tapping operation and at the termination thereof will control the withdrawal of the tap from the work. Similar operations can be carried out with other tools.

Referring to FIGURE 2, it will be noted that the limit switch 31 indicates that the selsyn control 23 has the spindle in its uppermost position. Actuation of the limit switch 31 permits rotation of the turret in a manner to assure no interference between the chuck and the turret.

The selsyns 11 and 12 are also operatively associated with the selsyn control 23 to assure that spindle travel occurs only at a time when the table is in its proper position. If desired under certain circumstances, this interlocking control may be circumvented so that the table may travel while the spindle is down thus permitting a line milling operation to be performed.

As previously mentioned a primary and a secondary tool holding device is utilized in the present machine. The rotation of the cam 45 not only bolts the turret in its proper position but also causes the cam follower 59 to urge the open claws 56 and 57 of the secondary tool holding device to advance toward the tool 8 as shown in FIGURE 9. After the frame 127 has passed to its outermost position on the rods 125 and 126 (FIGURES 6 and 9) the cam 45 causes the cam follower 58 to move the member 139 causing the pin 140 to slide along the surfaces 137 and 138 of the claws 56 and 57 in a manner to permit the spring 132 to close the claws 56 and 57 about the disc 99 and to engage the disc in the area of the groove 97. This latter action is shown in FIGURE 10.

FIGURE 10 also shows that the primary tool holding device releases the tool 8. This action may be better understood by referring to FIGURE 6. Movement of the surface 53 of the cam 45 on the cam follower 52 causes the pin 118 to move in the slot 119 away from the tool 8. Since the pin 118 is connected by means of the links 114 and 115 to the ends 110 and 112 of the bell cranks 50 and 51, the scalloped ends of the bell cranks release the tool. At this point (FIGURE 10) the tool 8 is being held only by the secondary tool holder 55. The spindle with the chuck 30 advances to a point adjacent to turret 7. The chuck 30 which is rotating passes into the opening 105 in the turret and the chuck engaging portion 102 (FIGURE 6) passes into the opening 161 of the chuck 30 until the frusto-conical portion 104 of the tool contacts the frusto-conical portion 162 of the chuck.

As the spindle continues to advance, the cam surface 167 of each of the cams 166 (FIGURE 7) engages a portion of the surface of the opening 105. The coaction between the helical cam surface 167 with the opening 105 causes relative (to the chuck 30) clockwise rotation of the cam 166 so that cam surface 170 is placed in a position to engage the shoulder 103 of the tool 8 (FIGURE 6).

While this action is being performed, that is, the tool is being engaged by the chuck 30, it is being movably supported by the secondary tool holder 55. Initially the frame 134 is biased upwardly in the frame 127 of the secondary tool holding device 55. This action is performed by the bias on the toggle links 143 and 144 transmitted to the toggle pin 145. As the chuck urges the tool downwardly, the frame 134 moves with the tool and the toggle pin 145 passes through the over center position wherein the toggle pin 145 is below the pins 146 and 147. The bias on the frame 134 is then in a downward direction. This downward position is shown in FIGURE 11.

The chuck 30 continues to move downwardly until the work tool is engaged and a suitable operation on the work piece is performed. This is shown in FIGURE 12. It will be noted that at this point the cam surface 168 of the cylindrical cam 166 is exposed.

It will be also noted that the motion of the tool has exceeded the maximum movement of the secondary tool holder 55 so that the disc 99 is no longer held by the claws 56 and 57, the force urging the chuck downwardly having overcome the bias of the spring 132.

After the working operation has been performed the selsyn control 23 (FIGURE 2) withdraws the chuck. The disc 99 is again engaged by the claws 56 and 57. The claws which are mounted in the frame 134 move upwardly with the tool to its uppermost position in the frame 127. Simultaneously the cam surfaces 168 of the cylindrical cams 166 engage the surface of the hole 105 in the turret. This causes the cams 166 to rotate in a clockwise position. The cam surface 170 of each cam 166 is removed from engagement with the shoulder 103 of the tool (FIGURE 6) and the chuck loses contact with the tool 8. This condition is substantially shown in FIGURE 13.

At this point the cam follower 52 causes the pin 118 to move in the slot 119 (FIGURE 6) to rotate the bell cranks 50 and 51 so that they grasp the tool below the shoulder 101 of the tool.

The cam follower 58 causes the reciprocal member 139 to move longitudinally so that the pin 140 engages the surfaces 137 and 138 thereby overcoming the bias of the spring 132 causing the claws 56 and 57 to release the disc 99. Sequentially the cam 45 actuates the cam follower 59 causing the frame 127 to withdraw from the tool 8. This is accompanied by continued withdrawal of the spindle and chuck from the tool. This condition is shown in FIGURE 14. As will be noted in FIGURE 14, the cam surface 167 is again exposed in the chuck.

The spindle continues to move upwardly until limit switch 31 (FIGURE 2) is contacted. The previously described engagement of the primary tool holding device 49 with the tool and the disengagement of the secondary tool holding device is caused by the rack and pinion drive 48 being returned to a position wherein the rack 67 is in the extreme left position. This action of the rack is in response to the tape reader which causes actuation of the hydraulic cylinder 65. It will be appreciated that such movement of the rack and pinion drive withdraws the bolt to the position shown in FIGURE 4 and the turret 7 is in condition to begin another cycle.

Referring to FIGURES 16, 17, and 18 there is shown another embodiment of the chuck 30. In this embodiment the chuck 30 includes a housing 200 which is connected to a spindle. The housing may include three hollow portions 203 which are located in the side of the housing and are equally spaced at a 120°. Each of the hollow portions 203 is adapted to contain a cylindrical cam 204 which is rotatably supported in the hollow portion 203 by means of pins 202 which are placed in the eccentrically located holes 201. If desired a suitable Belleville spring may be interposed about the pin 202 between the housing 200 and the cylindrical cam 204.

The housing 200 is provided with a suitable central opening 218 having an uppermost stop portion 219. The lowermost portion of the opening 218 has a frusto-conical surface 221.

The housing 200 is at least partially enveloped by a casing member 210 which has a plurality of openings 211 therein to permit portions of the cams 204 to extend therethrough. The uppermost portion of each opening 211 has a cam surface portion 214.

Each cylindrical cam member 204 has three surfaces. The first surface 206 which has a general helical shape and which extends along the cylindrical portion of the cam. A second helical portion 207 located on the cam 204 is similar to the surface 206 and is spaced therefrom. The surface 206 is intended to rotate the cam members 204 in a counter clockwise direction on the downward movement of the chuck and the cam surface 207 is intended to rotate the cam 204 upon upward movement of the chuck in a clockwise direction.

The cam 204 has a third cam surface which extends along the upper shoulder of the cam. This cam surface 208 is adapted to coact with a surface 214 of the casing member 210. It can be seen from FIGURES 16, 17 and 18 that rotation of the cam 204 will cause reciprocal motion of the casing member 210 relative to the housing 200 in a vertical direction.

The lower portion of the casing member 210 has an opening 216 from which extends an inner frusto-conical surface 217. The lower portion of the housing 200 as previously mentioned has a frusto-conical portion 221. A collet member is adapted to be enveloped by the housing and casing member. The collet 225 is a substantially cylindrical member having an upper frusto-conical surface 226 which is adapted to coact with the surface 220 of the housing 200. The collet has an intermediate frusto-conical surface 227 which is adapted to coact with the surface 221 of the housing 200 and a bottom frusto-conical surface 228 which coacts with the surface 217 of the casing member 210. The collet 225 is provided with a plurality of longitudinal slots which extend from the inner to the outer surface of the collet. The slots 230 extend upwardly substantially the length of the collet and the slots 229 extend downwardly substantially the length of the collet. These slots tend to give the collet flexibility to permit radial compression thereof.

It can be seen that rotation of the cam member 206 will cause the cam surface 208 to engage the cam surface 214 of the casing member 210 to cause upward movement of the casing member 210 relative to the housing 200. Relative movement between the casing member and the housing will cause coaction between the previously described frusto-conical surfaces of the housing, casing, and collet resulting in compression of the collet.

Referring to FIGURE 16, the chuck 30 is shown approaching the annular surface 235 and the tool 8. This tool 8 has a shank portion 236 which is adapted to be engaged by the collet 225. The lower portion of the tool 8 has a disc portion 99 with a groove portion 97 extending thereabout. This disc is adapted to be engaged by the claws 56 and 57. The tool is shown holding a working member 240 (FIGURE 17) which is supported by a collet 239, support member 237, and a knurled nut 238.

FIGURE 17 shows the chuck 30 having partially passed through the annular surface 235 with the shank 236 of the tool 8 extending into the collet 225, the uppermost portion resting against the stop 219 of the housing 200.

FIGURE 19 discloses a sectional view taken along the line 19—19 on FIGURE 17. It can be seen that the casing member 210 is restrained against rotational movement relative to the housing 200 by means of the longitudinal members 224. It will be also noted that the rotational movement of the cam members 204 is limited by the stops 222 and 223.

As the chuck continues to move downwardly as shown in FIGURE 17 the surfaces 206 of the cams 204 engage the annular surface 235 causing rotation of the cams. The surface 208 of each cam engages the surfaces 214 of the casing member 210 thereby causing relative motion between the housing and casing member resulting in the compression of the collet to grasp the shank of the tool 8. This condition is shown in FIGURE 18. It is also indicated in this view that the disc portion of the tool has overcome the bias on the claw members 56 and 57 and is no longer supported by these members.

FIGURE 20 discloses the condition of the cams 204 after passing through the surface 235. The cam surfaces 207 are exposed so that upon retraction of the chuck upwardly through the surface 235 the cam members 204 will rotate in a clockwise position permitting the casing member and housing to move relative to one another causing the collet 225 to release the tool 8. Just prior to this point the tool is again supported by the claws 56 and 57. After the chuck has passed through the annular surface 235 the cams return to the condition shown in FIGURE 19.

Referring to FIGURE 21, there is shown another embodiment of the apparatus in FIGURE 1 wherein the annular surface which actuates the cams of the chuck is not a portion of a turret but rather a stationary surface connected to the spindle head of the machine and located intermediate the spindle head portion of the machine and the turret. This portion 253 has an annular surface 254 through which the chuck 30 passes. The chuck passes downwardly and grasps tools 8 which are movably supported in tool holders 252 on the turret 251.

It will be appreciated that in the embodiment in FIGURE 21 there are only a single group of tool holders. This embodiment is applicable to small diameter turrets which are adequately supported for a limited number of tools. It can be readily seen that the arrangement of the chuck 30 as shown in FIGURES 16, 17, and 18 is adaptable for use in the machine shown in FIGURE 21.

While there have been described preferred embodiments of the present invention it will be appreciated that the invention is not to be limited thereto but that various modifications may be made without departing from the scope of the invention as set forth in the appended claims.

What we claim as new and desire to secure by Letters Patent of United States is:

1. In a material working machine of the type having a work table, a rotatable spindle having cam actuated tool engaging means, means for supporting a plurality of tools for movement selectively into position to be engaged by said tool engaging means, each of said tools including a surface adapted to be engaged by said cam actuated means, means for moving said spindle normally toward said table, said cam actuated tool engaging means being actuated during such movement to engage said surface to prevent withdrawal of the tool from said spindle, and means whereby said tool engaging means during such normal movement removes a selected tool from supporting engagement with said supporting means to effect a machining operation on a work piece.

2. In a material working machine of the type having a work table, a rotatable spindle having cam actuated tool engaging means, means for supporting a plurality of tools for movement selectively into position to be engaged by said tool engaging means, each of said tools including a surface adapted to be engaged by said cam actuated means, means for moving said spindle normally toward said table, said cam actuated tool engaging means being actuated during such movement to engage said surface to prevent withdrawal of the tool from said spindle, means whereby said tool engaging means during such normal movement removes a selected tool from supporting engagement with said supporting means to effect a machining operation on a work piece, said tool engaging means upon movement of said spindle normally from said table upon completion of a machining operation being arranged to return the tool to its supporiting means and release the tool.

3. In a material working machine, the combination of a table adapted to hold a work piece, a rotatable spindle adapted to move normally with respect to said table, means for holding a plurality of tools comprising a rotatable turret having individual tool holding devices, rotation of the turret selectively placing individual tools into alignment with the spindle, means including a chuck mounted on the spindle adapted to connect the spindle to a tool placed in alignment with the spindle, said chuck comprising tool engaging means and cam means operatively associated with the tool engaging means for actuating said tool engaging means, means for moving said spindle relative to said table to actuate the connecting means to connect a selected tool to the spindle, and means whereby said connecting means during such movement removes a selected tool from supporting engagement with its holding device.

4. The material working machine according to claim 3 in which the chuck comprises a housing, means defining a concentric opening in the housing adapted to partially envelop a tool, at least one rotor member eccentrically mounted in said housing, said rotor member having means for operatively engaging a tool passed into the opening in the housing, and means adapted to rotate the rotor member in response to a predetermined linear movement of the spindle.

5. The material working machine according to claim 4 in which the rotor member comprises a cylindrical cam, the cylindrical cam having a first cam surface adapted to operatively engage a tool to lock said tool into said chuck in response to rotation of the cylindrical cam, said cylindrical cam having a second cam surface adapted to rotate the cylindrical cam in response to a predetermined linear movement of the chuck causing an engagement of the second cam surface with an adjacent stationary surface.

6. In a chuck for use in an automatic machine, the combination of a housing adapted to be concentrically attached to a spindle, said housing having means defining an opening therein for retaining a tool, at least one rotor member eccentrically mounted in said housing, said rotor member having a first cam surface and a second cam surface, said first cam surface being adapted to operatively engage a tool in response to rotation of the rotor, said second cam surface being adapted to engage a surface external of said chuck, such engagement causing rotation of the rotor.

7. The chuck according to claim 6 in which the rotor member comprises a cylindrical cam, said second cam surface being a surface extending along the cylindrical surface of the cylindrical cam, said first cam surface extending along a shoulder of the cylindrical cam.

8. The chuck according to claim 7 in which the first cam surface is adapted to engage a shoulder on a tool to lock the tool in the chuck.

9. A chuck according to claim 7 further comprising a casing member which substantially envelops the housing, a collet adapted to retain a tool, said collet being enveloped by said casing member, said first cam surface being adapted to move said casing member relative to said housing, said housing having at least one frusto-conical surface adapted to engage said collet whereby relative motion between said casing member and said housing causes a radial compression to occur upon said collet thereby placing the chuck in a tool engaging position.

10. In a material working machine having a table, the combination of a rotatable spindle, a chuck mounted on said spindle, said spindle being adapted for linear movement relative to said table, said chuck having a cam, said cam being adapted to cause the chuck to engage a tool upon engagement of the cam with an external surface, a rotatable turret having individual primary tool holding devices, rotation of said turret placing a tool held by the primary tool holding device adjacent to and concentric with said chuck, means for linearly moving said spindle toward the tool, means to engage the cam on said chuck to place the chuck in a tool engaging position, means to continue the linear motion of the spindle adjacent the table.

11. The material working machine according to claim 10 in which the means engaging the cam on the chuck comprises a portion of the turret.

12. A material working machine according to claim 10 further comprising a secondary tool holding device, means for releasing the tool from the primary tool holding device, means to cause the secondary tool holding device to retain the tool after said primary holding device releases said tool, said secondary tool holding device being adapted to retain said tool while the tool moves with the chuck and the cam on the chuck is engaged by an external surface to cause the chuck to engage the tool.

References Cited in the file of this patent

UNITED STATES PATENTS

| | | |
|---|---|---|
| 1,238,929 | Muller | Sept. 4, 1917 |
| 2,363,208 | Sulzer | Nov. 21, 1944 |
| 2,514,472 | Cassidy | July 11, 1950 |
| 2,748,864 | Ewaldson | June 5, 1956 |
| 2,783,664 | Johnson | Mar. 5, 1957 |
| 2,859,644 | Watts | Nov. 11, 1958 |
| 2,956,454 | Hansen | Oct. 18, 1960 |

FOREIGN PATENTS

| | | |
|---|---|---|
| 258,358 | Switzerland | July 18, 1944 |
| 465,065 | Great Britain | Apr. 30, 1937 |
| 758,135 | Great Britain | Sept. 26, 1956 |

OTHER REFERENCES

Machinery, vol. 95, pages 987, 988, Nov. 11, 1959; Publication, Manual WS-59, Kearney & Trecker Corp., Milwaukee 14, Wisconsin; "Milwaukee-Matic."